United States Patent
Carson

(10) Patent No.: US 7,876,760 B2
(45) Date of Patent: *Jan. 25, 2011

(54) RATE ADAPTATION

(75) Inventor: Mark Brian Carson, Belfast (GB)

(73) Assignee: Flextronics International USA, Inc., San Jose, CA (US)

( * ) Notice: Subject to any disclaimer, the term of this patent is extended or adjusted under 35 U.S.C. 154(b) by 210 days.

This patent is subject to a terminal disclaimer.

(21) Appl. No.: 11/901,743

(22) Filed: Sep. 17, 2007

(65) Prior Publication Data

US 2008/0075219 A1    Mar. 27, 2008

(51) Int. Cl.
    *H04J 3/22* (2006.01)
(52) U.S. Cl. .................................. 370/392; 370/465
(58) Field of Classification Search ................ 370/389, 370/412, 352, 392, 503, 506, 465
    See application file for complete search history.

(56) References Cited

U.S. PATENT DOCUMENTS

| | | | |
|---|---|---|---|
| 4,866,704 A | 9/1989 | Bergman | |
| 4,937,820 A | 6/1990 | Kawula | |
| 4,996,698 A | 2/1991 | Nelson | |
| 5,268,936 A | 12/1993 | Bernardy | |
| 5,548,534 A | 8/1996 | Upp | |
| 5,796,796 A | 8/1998 | Wang | |
| 5,852,630 A | 12/1998 | Langberg et al. | |
| 6,064,706 A | 5/2000 | Driskill et al. | |
| 6,622,205 B1 | 9/2003 | Weiss | |
| 6,765,928 B1 * | 7/2004 | Sethuram et al. | 370/476 |
| 6,882,662 B2 | 4/2005 | Subrahmanyan et al. | |
| 6,982,993 B1 | 1/2006 | Claveloux et al. | |
| 7,369,496 B1 | 5/2008 | Wiggins et al. | |
| 7,646,836 B1 | 1/2010 | Mays | |
| 2001/0012288 A1 * | 8/2001 | Yu | 370/352 |
| 2002/0144169 A1 | 10/2002 | Ranganath et al. | |
| 2003/0112685 A1 | 6/2003 | Duh et al. | |
| 2003/0120799 A1 * | 6/2003 | Lahav et al. | 709/236 |
| 2005/0198361 A1 | 9/2005 | Chandra et al. | |
| 2006/0002405 A1 | 1/2006 | Le Sauze et al. | |
| 2006/0190641 A1 | 8/2006 | Routliffe et al. | |
| 2008/0235504 A1 | 9/2008 | Brown et al. | |

OTHER PUBLICATIONS

International Search Report, PCT/US2007/03616, dated Dec. 5, 2007.
Office Action in U.S. Appl. No. 11/704,731, mailed Sep. 15, 2009.
Office Action in U.S. Appl. No. 11/704,731, mailed May 19, 2010.

(Continued)

*Primary Examiner*—Brian D Nguyen
(74) *Attorney, Agent, or Firm*—Nixon Peabody LLP

(57) ABSTRACT

A method and system for providing single stage pointer and overhead processing is disclosed. In accordance with one embodiment of the invention, data including bytes of each of multiple types of overhead data is received at a logical element of a communications network. The logical element includes a labeler to label the bytes of each of the multiple types of overhead data and a pointer processor to read the labeled bytes and perform specific operations corresponding to the label, wherein the bytes of at least one type of overhead data are labeled based on feedback provided by the pointer processor to the labeler.

21 Claims, 3 Drawing Sheets

OTHER PUBLICATIONS

Office Action in U.S. Appl. No. 11/704,732, mailed Dec. 10, 2009.
Office Action in U.S. Appl. No. 11/704,732, mailed Sep. 2, 2010.
Office Action in U.S. Appl. No. 11/899,726, mailed Jun. 22, 2010.
Office Action in U.S. Appl. No. 11/704,731 mailed Oct. 13, 2010.
Office Action in U.S. Appl. No. 11/899,726 mailed Nov. 29, 2010.

* cited by examiner

Labeller Detail

RATE ADAPTATION

CLAIM OF PRIORITY

This application is a non-provisional application claiming priority to provisional application Ser. No. 60/772,145, filed on Feb. 9, 2006, entitled "METHODS AND APPARATUS FOR CONDUCTING SINGLE STATE POINTER PROCES'SING, RATE ADAPTATION BY DELETION OF UNUSED OVERHEAD BYTES, TECHNIQUE FOR MARKING J1N5 POSITIONS IN AN ELASTIC STORE, EGRESS POINTER SMOOTHING, CENTRALIZED OVERHEAD AND POINTER PROCESSING," and application Ser. No. 11/704,731, filed on Feb. 9, 2007, entitled "SINGLE STAGE POINTER AND OVERHEAD PROCESSING," which are herein incorporated by reference in their entirety.

FIELD

Embodiments of the invention relate generally to the field of data communication and more specifically methods and apparatuses for providing efficient network data communications.

BACKGROUND

Typically for a Sonet/SDH framer, a significant portion of the logic associated with an incoming optical line is clocked using a clock signal derived from that line. The blocks clocked at this 'line rate' would typically be Section Overhead extraction, High Order Pointer Interpretation and the write function of the High Order Elastic Store.

FIG. 1 illustrates a typical frame architecture in accordance with the prior art. As shown in FIG. 1, the line CDR block recovers the clock and data from the in-coming data traffic. The line framer locates the framing bytes (e.g. A1 and A2 bytes) to determine the location of all of the other overhead bytes. As illustrated, the line framer in the conventional architecture is single channel.

The network information of the SDH frame has to be separated from the actual frame data (customer data traffic) at this stage. The system converts the data onto a different clock rate without losing any of the information. Typically, the transport overhead is extracted within the line clock domain. The high order pointer processing moves the customer's data from the line clock domain into the system clock domain. In order to avoid losing any of the information, a set of pointers is examined that indicate where the data is located inside the overall container. This ensures that all of the customer data is put into the elastic store. Within the system clock domain, the pointer generator is responsible for taking that data out of the high order elastic store (typically a set of 12-48 FIFOs) and handling any frequency changes. That is, the in-coming data rate could be 10 PPM faster or slower than the system clock domain rate. An in-coming rate faster than the system clock, may result in lost data. The combination of the higher order pointer processor, elastic store, and pointer generator produce output data, that accommodates any frequency offsets. Therefore, a conventional system supporting multiple optical interfaces requires a large number of clock domains each having a significant number of logic elements. Furthermore, since each block of logic is on a separate clock domain, logic elements cannot be shared between channels, and must be implemented separately for each channel.

A further disadvantage of conventional architecture is that they typically employ separate high order and low order pointer processors that require a large number of logic elements to perform each function. As shown in FIG. 1, the low order pointer processor uses the high order pointer processor to identify the location of the low order pointers. Since any individual byte cannot be part of both pointer types, the operation of large portions of these blocks are similar and mutually exclusive. That is, when processing high order pointers, the elements responsible for low order processing are idle and vice-versa, so the conventional architecture is inefficient in terms of logic.

SUMMARY

In accordance with one embodiment of the invention, data including bytes of each of multiple types of overhead data is received at a logical element of a communications network. The logical element includes a labeler to label the bytes of each of the multiple types of overhead data and a pointer processor to read the labeled bytes and perform specific operations corresponding to the label, wherein the bytes of at least one type of overhead data are labeled based on feedback provided by the pointer processor to the labeler.

Other features and advantages of embodiments of the present invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION

A method and apparatus that allows traffic from one or more interfaces to be processed using a common clock frequency. For one embodiment of the invention, the common clock frequency is slightly (e.g., 10-400 PPM) more than the frequency of the in-coming signal. For one embodiment of the invention, one or more overhead bytes that are no longer required for data processing are deleted from each frame. For one such embodiment, all but one of the A1 and A2 bytes are deleted. For one such embodiment, multiple input channels share a single logical block thus reducing the number of logical blocks and the number of logical elements clocked at incoming line rates. In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Embodiments of the invention are applicable to wide range of systems in which data is communicated.

Rate Adaptation

For one embodiment of the invention, rate adaptation is effected by running part of the system at a slightly higher frequency so that all of the information is processed without loss. Subsequent to the framer block one or more overhead bytes are discarded, thus guaranteeing that the information coming out of the multi-channel framer is at a lower rate than the system clock domain. For example, once the framer block has located the frame, using the bytes referred to as A1 and A2, these bytes are no longer needed and one or more can be discarded. This will accommodate well over the potential difference of 10 PPM. For one embodiment of the invention, all but one of the A1 bytes is discarded.

Figure 2:
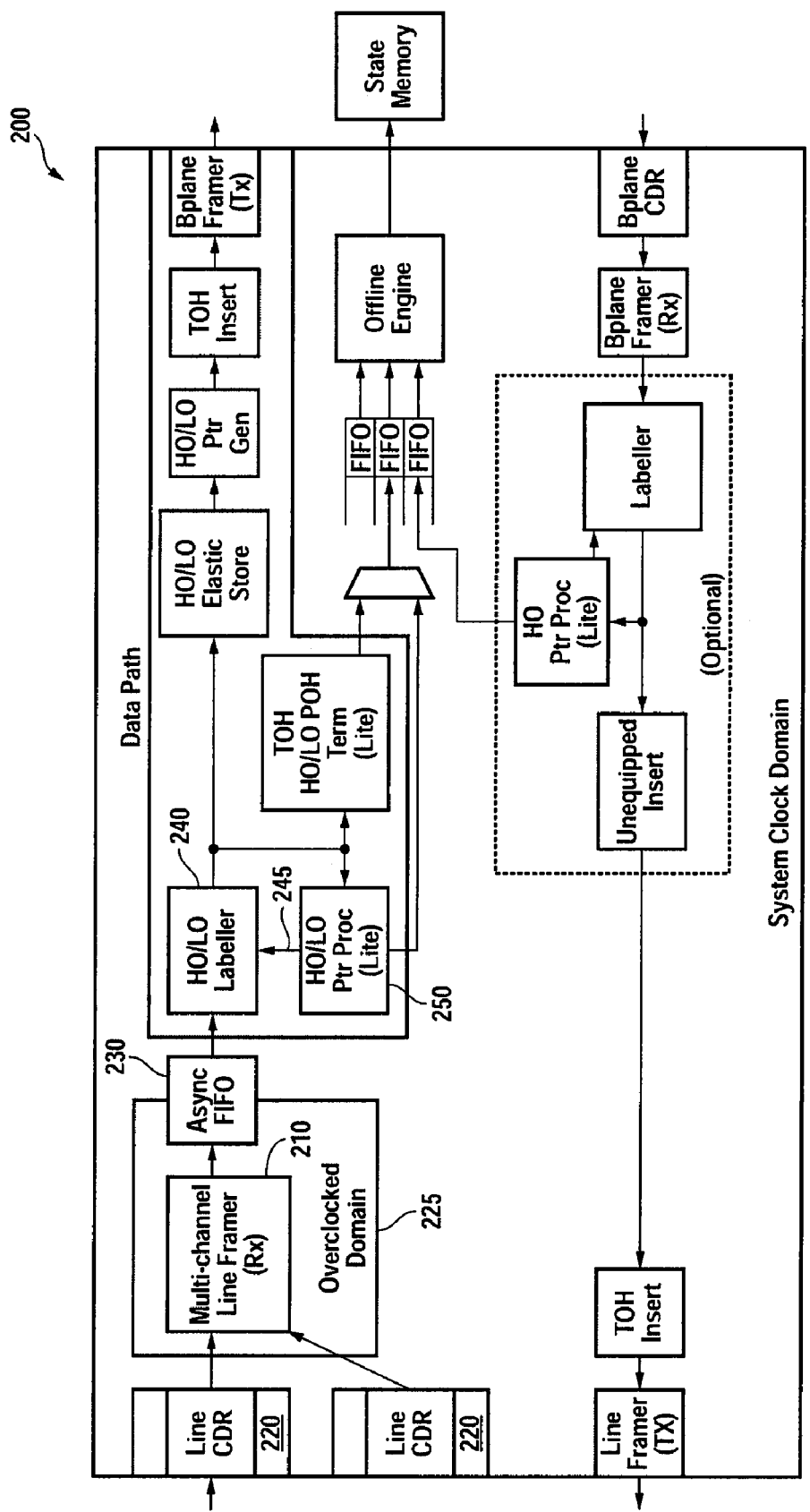
FIG. 2 illustrates a system architecture providing rate adaptation in accordance with one embodiment of the invention.

FIG. 2 illustrates a system architecture providing rate adaptation in accordance with one embodiment of the invention. As shown in FIG. 2, a multi-channel line framer 210 receives input from one or more line CDRs 220.

For one embodiment of the invention the line CDR 220 is put into an overclocked domain. The multi-channel framer uses the alignment bits to determine the frame start position of an incoming line and then deletes one or more of the alignment bits. For one embodiment of the invention, all but one of the alignment bits are deleted. In general, enough of the alignment bits are deleted to reduce the frequency sufficiently to guarantee that the system clock can effectively process the data.

The information from all of the different channels coming out of the multi-channel framer 210 is then passed into the asynchronous FIFO 230 which performs a conversion of the data from the overclock domain 225 into the system clock domain. For one embodiment of the invention, the asynchronous FIFO is implemented as a single FIFO element in contrast to prior art schemes that require multiple FIFOs for the elastic store as described above.

Due to the deletion of one or more overhead bits (e.g., alignment bits), the amount of information coming into the FIFO, is guaranteed to be slower than the system clock domain. That is, for example, if a number of the A1 or A2 bytes are deleted from each frame, then it can be shown that the new data rate will, on average, be less than the system clock rate, even if the incoming line is operating at the maximum permissible frequency. For example, deleting 2 out of the 3 A1 bytes in an STM-1 flow effectively reduces the data rate by 823 ppm, if only one byte is deleted, the rate reduction is 411 ppm. This is far beyond the maximum permissible frequency offset between the line and system clocks. For an STM-16 deleting sixteen bytes would produce a corresponding rate reduction. In general, deleting a number of the A1 or A2 bytes allows a framed signal to be adapted to the local system clock rate. A number of such signals can then be multiplexed together before being processed. In this way processing blocks can be shared between channels.

For one embodiment of the invention, the deletion of the overhead occurs once every 125 microseconds. For such an embodiment, the data from the multi-channel line framer 210 will be arriving at the async FIFO 230 faster than the system clock domain. But if the sizing of the FIFO is correct then the regular appearance of a gap when information isn't written at the framing byte is enough to ensure that the async FIFO does not overflow.

Figure 3:
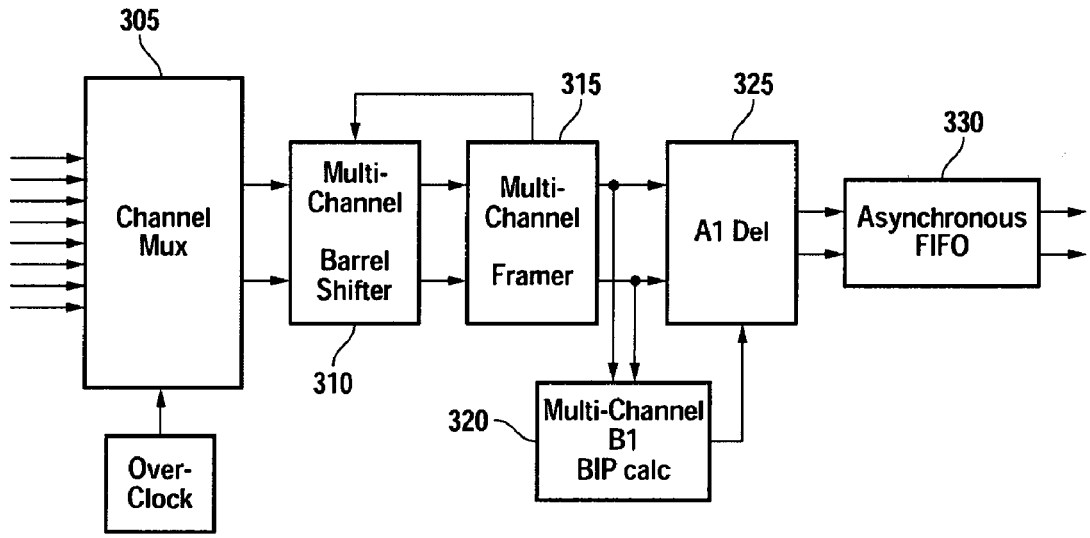
FIG. 3 illustrates an apparatus for effecting rate adaptation in accordance with one embodiment of the invention.

FIG. 3 illustrates an apparatus for effecting rate adaptation in accordance with one embodiment of the invention. As shown in FIG. 3, the entire design, up to the asynchronous FIFO 330 is over-clocked to allow for line rates which are higher than the node rate. Incoming data from each physical port is combined in the channel mux 305. The data will normally be 8 bits wide, but not byte aligned. The channel mux 305 ensures fair selection of bytes from each port.

The output from the channel mux 305 is a byte of data and a channel number. This is processed by the barrel shifter 310 to achieve the correct byte alignment. The barrel shifter 310 changes the bit alignment when instructed to do so by the framer 315. This block behaves in the same manner as the prior art, with the exception that it is a multi-channel implementation. The framer 315 is a state machine looking for the Sonet/SDH framing pattern of A1(0xF6) and A2(0x28). When this is found repeatedly at one point in the frame, the framer 315 'locks' onto the frame structure. When out of lock the framer 315 instructs the barrel shifter 310 to search for the A1 byte at any possible bit offset. This block behaves in the same manner as the prior art, with the exception that it is a multi-channel implementation.

The A1 deletion block 325 locates the framing bytes identified by the framer 315, and marks these as invalid, preventing their being written into the asynchronous FIFO 330. For one embodiment, one of the A1 bytes is retained to act as a start of frame marker for the system. For one such embodiment, since the actual value of the A1 byte is of no further use in the system, it is replaced by a BIP value for the frame which has been determined by the B1 BIP calc block 320. This is because the B1 is calculated across all frame bytes including A1 and A2 and could therefore not be calculated accurately in subsequent blocks, after the deletion of some A1s.

The data and channel number are passed to the remainder of the circuit via the asynchronous FIFO 330. In addition flags are appended to the data to indicate, at least, the start of frame. The asynchronous FIFO 330 handles the handoff between the framer's over-clocked domain, and the remainder of the design operating at system rate. The asynchronous FIFO 330 is prevented from overflowing by the deletion of the A1 bytes.

Single Stage Pointer and Overhead Processing

Figure 1:
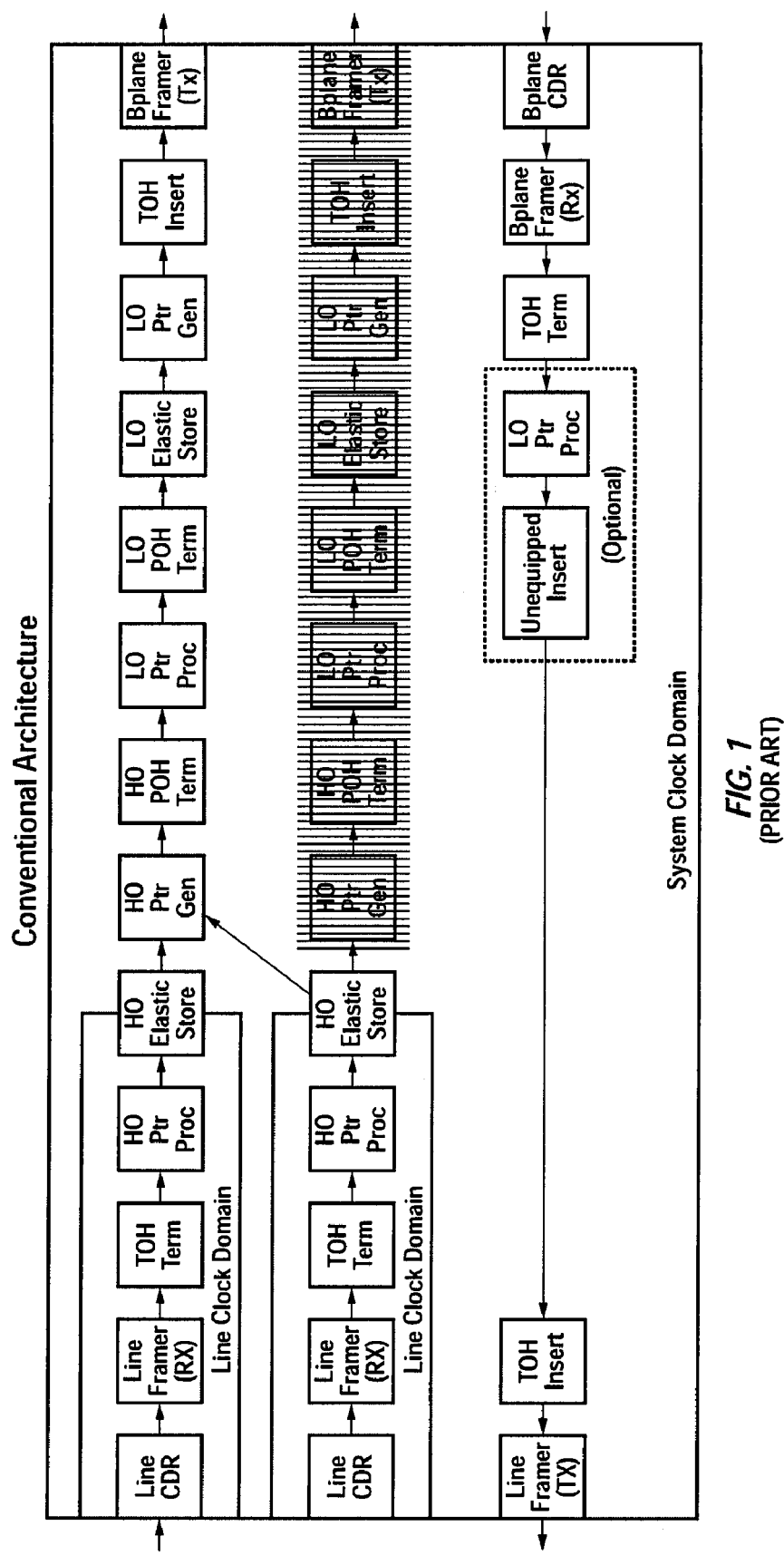
FIG. 1 illustrates a typical frame architecture in accordance with the prior art.

Once the frequency offset is addressed, either through byte deletion as described above, or through an alternative scheme, it is possible to implement a single stage pointer and overhead processing scheme in accordance with one embodiment of the invention. (One alternative scheme to address the frequency offset is to extend the overclocked domain to include the labeler, the high and low order pointer processor and the overhead termination block of the prior art system shown in FIG. 1.

As discussed above, conventional schemes employ separate high and low order pointer processors, and therefore require a number of logic elements to perform both functions. When processing high order pointers, the elements responsible for low order processing are idle and vice-versa, so the implementation is inefficient in terms of logic.

An embodiment of the invention combines the high and low order pointer processors into one block, thereby reducing the amount of logic required in an ASIC or FPGA to perform both high and low order pointer processing. Such combination is not possible with the conventional scheme as the low order pointer processor uses the high order pointer processor to identify the location of the low order pointers. An embodiment of the invention implements a labeler responsible for labeling each of the pointer bytes (both high and low order), and a pointer processor which reads the labeled bytes, and performs the operations defined in the relevant standards.

Referring again to FIG. 2, system 200 includes a high/low order labeler 240 coupled to a high/low order pointer processor 250. A feedback path 245 exists from the high/low order pointer processor 250 to the high/low order labeler 240. So the data coming out of the labeler goes into the HO and LO pointer processor and then some information from the HO and LO pointer processor goes back into the labeler. This informs the labeler when events such as pointer changes occur, the labeler uses this information to correctly label the low order pointer bytes. Information describing High Order Pointer operations is fed back from the high/low order pointer processor 250 to the high/low order labeler 240, allowing the low order payload area to be identified correctly by the labeler. By also feeding back the information describing Low Order pointer operations, both can be acted on by the high/low order labeler 240, removing the need for the traffic to flow through the two processing stages as in conventional schemes. This results in further logic saving, by removing the need for some additional pipeline registers. Embodiments of the invention combine the high and low order pointer processor as well as high and low order path overhead termination block.

For one embodiment of the invention, the labeler block is doing three independent tasks in parallel. The first one is it is labeling up the frame structures as is done in the TOH termination in the prior art scheme.

The second task the labeler performs is to label the high order pointer bytes (H1 and H2). As the high order pointer bytes come out of the labeler and pass into the high and low order pointer processor it is able to determine what the high order pointer value is effectively based on those labeled bytes. The high and low order pointer processor passes that information back into the labeler (i.e., the high order labeling function). This is required to label a moving structure, so it must use the received pointer value, rather than just counting through the frame. Using those pointer values, it can then identify further regions within this moving portion of the data.

The third task of the labeler is to determine the bytes associated with the low order data. A second set of pointers point to the low order data within the high order data. These bytes (V1 and V2) are identified by the labeler, and passed to the pointer processing block.

The processed value of the low order pointer is provided to the labeler (i.e., the low order labeling function). This is used to determine the position of the customer data within the low order portion and label the appropriate bytes in it.

Figure 4:
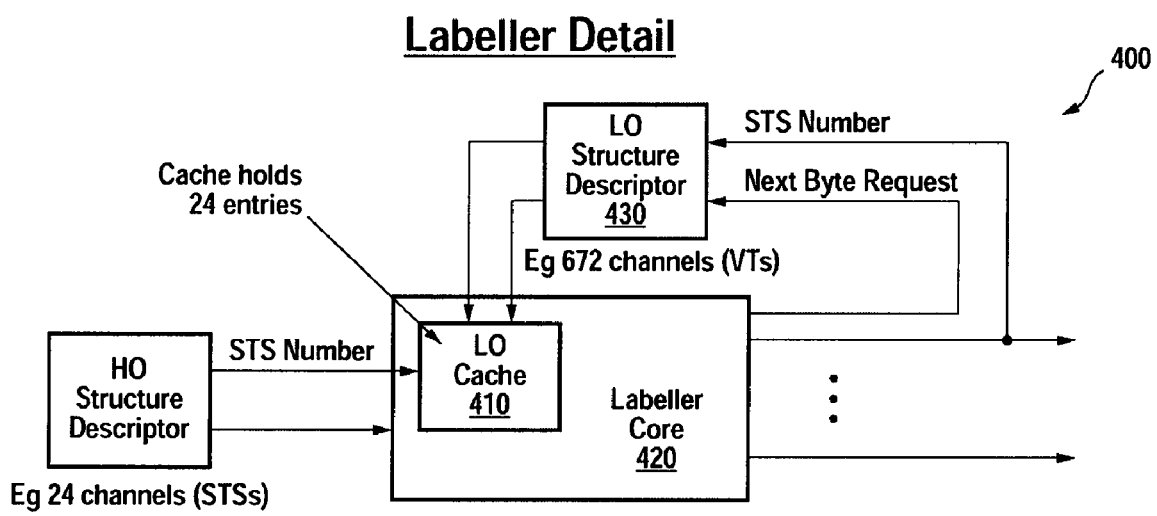
FIG. 4 illustrates a labeler for effecting a single stage pointer and overhead processing scheme in accordance with one embodiment of the invention.

FIG. 4 illustrates a labeler for effecting a single stage pointer and overhead processing scheme in accordance with one embodiment of the invention. For one embodiment of the invention, the labeler performs all of its functions within one clock cycle. As shown in FIG. 4, labeler 400 includes a low order cache 410. The low order cache 410 stores prefetched processing information from an external memory. That is, at some point earlier in the frame, the byte that is to be processed for a particular channel is known. The bytes can be prefetched from, for example, a large external ram taking several clock cycles to do that, and stored in the low order cache.

When the data needs to be processed, the information can be fetched from the low order cache. As each entry in the cache is used, a fetch is performed on the large external ram, to load the next required data for that cache location. In this way, the information required for low order processing is always available from the cache.

Such an embodiment provides a reduction in the required logic of prior art schemes in which information relating to the high order structure could not be processed in the labeler core 420 at the same time as information relating to the low order structure. This is because the low order state depends on the decisions made by the high order processing, and could not be fetched from the low order structure descriptor 430 until high order processing was complete. Since fetching data from the low order structure descriptor 430 requires several clock cycles, both operation could not conventionally be performed in one clock cycle.

General Matters

Embodiments of the invention include apparatuses and methods for effecting rate adaptation by deleting overhead bytes. Embodiments of the invention have been described above with various specific details. It will be appreciated that such details are examples and may be modified. For example, as described above the line CDR is put into an overclock domain. For alternative embodiments, the line CDR can be the line clock domain itself.

For alternative embodiments of the invention, variations can be made in the number and type of byte deleted (e.g., all A1 bytes, all A2 bytes, etc.). Additionally, an embodiment of the invention may be implemented in a single channel form, rather than the multi-channel version described above. Such an embodiment provides the advantage of reducing the amount of logic operating in line clock domains, but offers less gate count savings.

Embodiments of the invention also provide methods and apparatuses to effect both the HO and the LO pointer processing and overhead termination using one piece of logic.

Embodiments of the invention have been described as including various operations. Many of the processes are described in their most basic form, but operations can be added to or deleted from any of the processes without departing from the scope of the invention.

The operations of the invention may be performed by hardware components or may be embodied in machine-executable instructions, which may be used to cause a general-purpose or special-purpose processor or logic circuits programmed with the instructions to perform the operations. Alternatively, the steps may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A logical element of a communications network, the logical element comprising:
a memory;
a label processor configured to label bytes of each of multiple types of overhead data with a label, the overhead data being part of a data stream from which alignment bits were selectively deleted to reduce an overclocked rate thereof; and
a pointer processor configured to read the labeled bytes and perform specific operations corresponding to the label, wherein information provided to the label processor from the pointer processor is used to label bytes of at least one type of the overhead data.

2. The logical element of claim 1 wherein the multiple types of the overhead data include transport overhead, high order pointer data, and low order pointer data.

3. The logical element of claim 1 wherein the information provided to the label processor from the pointer processor is used to label low order pointer bytes.

4. The logical element of claim 1 wherein the information is provided to the label processor from the pointer processor via a feedback path from the pointer processor to the label processor.

5. The logical element of claim 1 implemented within a field programmable gate array.

6. The logical element of claim 1 wherein the label processor includes a low order cache to store prefetched processing information.

7. The logical element of claim 1 wherein each type of the overhead data has a same clock rate effected by deleting one or more overhead bytes subsequent to framing.

8. A method comprising:
receiving data at a logic device having a memory;
overclocking the received data;
selectively deleting alignment bits from the overclocked data;
receiving the overclocked data, the overclocked data including bytes of each of multiple types of overhead data;
using a functional block of the logic device to label the bytes of each of the multiple types of the overhead data with a label;
reading the labeled bytes; and
performing specific operations corresponding to the label, wherein the bytes of at least one type of overhead data are labeled based on feedback information provided to the functional block.

9. The method of claim 8 wherein the multiple types of the overhead data include transport overhead, high order pointer data, and low order pointer data.

10. The method of claim 8 wherein the feedback information provided to the functional block is used to label low order pointer bytes.

11. The method of claim 8 wherein the feedback information is provided to the functional block from a pointer processor via a feedback path from the pointer processor to the functional block.

12. The method of claim 8 wherein the logic device is a field programmable gate array.

13. The method of claim 8 wherein the functional block includes a low order cache to store prefetched processing information.

14. The method of claim 8 wherein each type of the overhead data has a same clock rate effected by deleting one or more overhead bytes subsequent to framing.

15. A computer readable medium having stored thereon executable instructions, which when executed by a processor, cause the processor to perform a method, the method comprising:
receiving data at a logic device having a memory;
overclocking the received data;
selectively deleting alignment bits from the overclocked data;
receiving the overclocked data, the overclocked data including bytes of each of multiple types of overhead data;
using a functional block of the logic device to label the bytes of each of the multiple types of the overhead data with a label;
reading the labeled bytes; and
performing specific operations corresponding to the label, wherein the bytes of at least one type of overhead data are labeled based on feedback information provided to the functional block.

16. The computer readable medium of claim 15 wherein the multiple types of the overhead data include transport overhead, high order pointer data, and low order pointer data.

17. The computer readable medium of claim 15 wherein the feedback information provided to the functional block is used to label low order pointer bytes.

18. The computer readable medium of claim 15 wherein the feedback information is provided to the functional block from a pointer processor via a feedback path from the pointer processor to the functional block.

19. The computer readable medium of claim 15 wherein the logic device is a field programmable gate array.

20. The computer readable medium of claim 15 wherein the functional block includes a low order cache to store prefetched processing information.

21. The computer readable medium of claim 15 wherein each type of the overhead data has a same clock rate effected by deleting one or more overhead bytes subsequent to framing.

* * * * *